US006472973B1

(12) United States Patent
Harold et al.

(10) Patent No.: US 6,472,973 B1
(45) Date of Patent: Oct. 29, 2002

(54) INFORMATION COLLECTOR AND DISSEMINATOR FOR A REALTY LOCK BOX

(76) Inventors: Gale Harold, P.O. Box 902, Blairsville, GA (US) 30516; Sam Davis, 790 Bramlett Shoals Rd., Lawrenceville, GA (US) 30045-6687; Harold L. Marquis, 2365 Ross Rd., Lithonia, GA (US) 30054; Larson Robin, 4730 Bryson Cove, Lilburn, GA (US) 30047

( * ) Notice: Subject to any disclaimer, the term of this patent is extended or adjusted under 35 U.S.C. 154(b) by 0 days.

(21) Appl. No.: 09/253,261

(22) Filed: Feb. 19, 1999

(51) Int. Cl.[7] .................................................. H04Q 1/00

(52) U.S. Cl. ...................... 340/5.73; 340/5.1; 340/5.23; 340/5.25; 340/5.33; 340/5.61; 340/5.64; 379/100.05; 379/100.06; 70/63

(58) Field of Search ................................ 340/5.1, 5.64, 340/5.73, 5.25, 5.23, 5.61, 5.33; 379/100.05, 100.06; 70/63; 235/382

(56) References Cited

U.S. PATENT DOCUMENTS 4,594,637 A 6/1986 Falk
4,609,780 A 9/1986 Clark
4,777,556 A 10/1988 Imran
4,800,255 A 1/1989 Imran
4,851,652 A 7/1989 Imran
4,864,115 A 9/1989 Imran et al.
5,475,375 A * 12/1995 Barrett et al. .............. 340/5.25
5,602,536 A * 2/1997 Henderson et al. ......... 340/523
5,654,696 A * 8/1997 Barrett et al. .............. 340/5.33
5,705,991 A * 1/1998 Kniffing et al. ............ 340/5.28
5,815,557 A * 9/1998 Larson ....................... 340/5.64

* cited by examiner

*Primary Examiner*—Michael Horabik
*Assistant Examiner*—Yves Dalencourt
(74) *Attorney, Agent, or Firm*—Thomas, Kayden, Horstemeyer, & Risley LLP

(57) ABSTRACT

This invention is the addition of a wireless radio link to a real estate lock box to transfer the data obtained from the access keypad to a nearby receiver which sends the data to a central site computer and compiles the data for dissemination. The lock box can also be controlled from a central site via a radio link.

14 Claims, 7 Drawing Sheets

INFORMATION COLLECTOR AND DISSEMINATOR FOR A REALTY LOCK BOX

FIELD OF THE INVENTION

This invention relates to devices for collecting and electronically distributing information relating to the activity in a realty lock box.

PRIOR ART

U.S. Pat. No. 4,594,637 (Falk) discloses a lock mechanism in a housing with an electronic decoder and detector for receiving power from a separate electromechanical device. The electromechanical device has a battery for powering both the electronic decoder and lock-release mechanism with a keypad to actuate the mechanism.

U.S. Pat. No. 4,609,780 (Clark) discloses an electronic entry system including a case and a container carried by the case. A mechanism is carried by the case and the container is moveable between the container retaining and container access positions. An electromagnetic latch mechanism is carried in the case. A power supply and circuitry is used to connect the power supply to the electromagnetic latch mechanism. A code-actuated assembly is carried by the case and connected to the circuitry to operate the electromagnetic latch mechanism.

U.S. Pat. No. 4,777,556 (Imran) discloses a circuit for changing a high voltage to a low voltage power source for energizing a low voltage solenoid.

U.S. Pat. No. 4,800,255 (Imran) also discloses an electronic access card, which has a printed circuit board, microprocessor, keyboard, and a visual display for displaying information carried in the microprocessor.

U.S. Pat. No. 4,851,652 (Imran) describes a lock box for use with a D.C. power source which has a housing and a movable key container mounted in the housing. Circuitry is provided to control the movement of the key container between accessible and inaccessible positions through use of an access card.

U.S. Pat. No. 4,864,115 (Imran et al.) discloses an electronic access card with a printed circuit board with a battery and a microprocessor on the board. A number of keys are carried by the board. The card is adapted to be used in a lock box of the type used in the real estate industry for providing a secure location for a house key.

BACKGROUND OF THE INVENTION

It has become a common practice in the real estate industry for realtors to place a lock box on a house or another piece of property for sale that contains a key to the property. Access to this key is frequently obtained by a real estate agent using an electronic key to open the lock box to obtain the key. This type of lock box is described in U.S. Pat. No. 4,594,637 (Falk). This type of lock box stores certain data, such as the number of the electronic key, the time and date of entry. This information can later be downloaded at a central terminal for a small number of entries. Unfortunately, there is no easy method of instantly obtaining this data that is very valuable to a sting realtor and to a showing realtor in conducting their business. By the time the lock box is taken to a central location for downloading, or a computer for downloading is taken to the lock box, the information contained usually has little commercial value. A lock box cannot be easily modified to electronically transfer the data stored because the lock box contains no battery. The battery is contained in the access key pad module which powers the decoder solenoid which activates the hasp holding the box in place.

OBJECTS OF THE INVENTION

It is an object of this invention to develop a system for contemporaneously transferring the information being stored in a lock box as to the time and date of entry and the real estate agent entering the premises.

It is a further object of this invention to modify the existing lock boxes so that the information being stored can be contemporaneously transferred without the necessity of placing a battery in the lock box although use of a battery is not excluded.

It is another object of this invention to collect the information being stored in the lock box and transmit the information to a central site for processing on a computer for distribution to persons interested in this information.

It is another object of this invention to combine the modifications to the existing technology into a new product that incorporates the improvements described herein.

SUMMARY OF THE INVENTION

This invention consists of the addition of a wireless radio link to a lock box to transfer the data obtained from the access key pad to a nearby receiver which sends the data to a central site computer. The collector-transmitter unit is installed in the lock box to intercept the exchange of information between the key pad and the lock box and transmit this data by radio to a nearby receiver unit. This receiver unit includes a microprocessor and access to a telemetry land service, land line telephone, cellular or other wireless means of communication. The receiver may be designed to either initiate or answer a request for data transfer with the central site computer. Each receiver has a unique identifier code that is transmitted with the lock box data so the central site computer may determine the location of the receiver and hence the property address. The data transmitted from the lock box through the transmitter includes the agent number and time and date of entry into the lock box.

The central site computer can gather the data from many different locations which can be compiled into a timely data base of activity at the entry system locations. If the receivers have two way communication ability with the central site computer, the computer may poll all the remote receivers on an hourly, daily, or demand basis.

The central site computer can be accessed by multiple users to remotely obtain data that is currently only stored in the lock box. This data showing activity on a property is very valuable commercial information that can be provided to potential sellers, buyers, and listing agents on a fee basis. The value of this information is directly related to its timeliness which is the primary benefit of this invention. For example, a seller may ask a high price, accept an offer, or wait for a better offer when he or she is aware of the showing activity of the property. Likewise, a buyer may vary the offer based upon the showing activity and agents may alter their sales strategy based upon the showing activity of a property or properties in a given area.

The lock box is the central repository of this information in that it is necessary to access the lock box to obtain a key to gain entry to the property and the lock box can only be opened by a sales agent with a battery powered keypad entry system and the lock box stores in memory the time, date and agent code for the last approximately ten (10) visits by agents. The enhancements may also be implemented using the widely available cellular telephones and paging systems to effectively implement telephones and paging systems to effectively implement the concept of using a wireless network to gain access to property to be sold and gather information on selling activity. The keypad with battery currently used to authorize the access code and release the key retention mechanism is replaced with a pager with battery, thus incorporating a direct radio link to the central site computer. The agent inserts the new pager with battery into the lock box in lieu of a keypad with battery. Using a telephone, cellular or land-line, the agent calls the central computer and enters, either from the phone keypad or vocally, the agent's identifier code and the lock box identifier code. The telephone can be incorporated into the pager keypad. After verifying the codes, the central site computer transmits directly to the pager inserted in the lock box a command to release the key. To enhance security, two-way pager technology may be included to transmit back to the central site computer an identifier code from the lock box to identify the lock box and also verify that the lock box opened. An alternate implementation is to use a pager in one-way mode, where the pager keypad module is inserted into the lock box and the agent enters his identification code and a code for the lock box The agent's identification code may be stored in the pager keypad and transmitted to the central side computers. The lock box code can be entered manually by the agent. These codes are transmitted to the central site computer while releasing the key without verification and authorization from the central site computer.

DETAILED DESCRIPTION OF THE DRAWINGS

Figure 1:
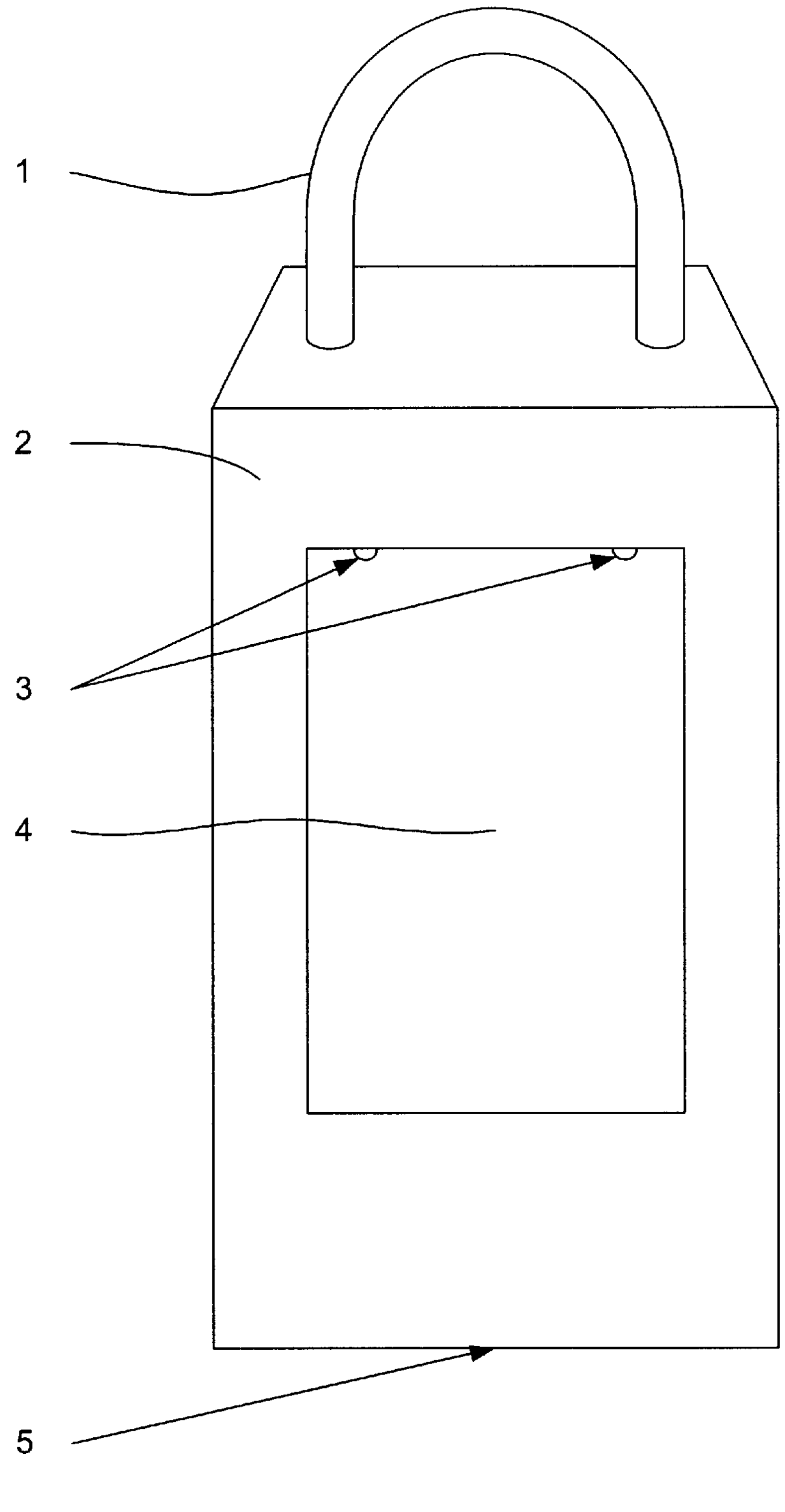
FIG. 1 is a perspective view of a lock box of the type that is currently being used for securing a key to a house, building or property.

FIG. 1 shows a lock box of the type that is currently being used for securing a key to a house or building or other property, such as a vehicle, to be sold. The key to access the property is contained in a moveable key receptacle in the box. The box is constructed of metal with a thick rubber or plastic protective cover. The hasp 1 is installed on a doorknob or handle to the property to be sold. The hasp can be released by energizing an internal solenoid when the lock box is properly accessed with a keypad. The keypad (not shown) is inserted into a recessed area 4 in the lock box. The keypad has electrical contacts, which are brought into contact with the contacts 3 on the lock box. The keypad has a number of numbered keys, which must be pressed in the proper sequence to open the movable key receptacle 5 in the bottom of the box. A different code must be utilized when opening the hasp of the lock box. When the proper code is entered, which identifies the agent entering the lock box and the time and date of entry, the movable key receptacle is released, and the key can be removed from the receptacle. The digital codes and the keypad battery power are transferred to the circuitry inside the lock box through contacts 3.

Figure 2:
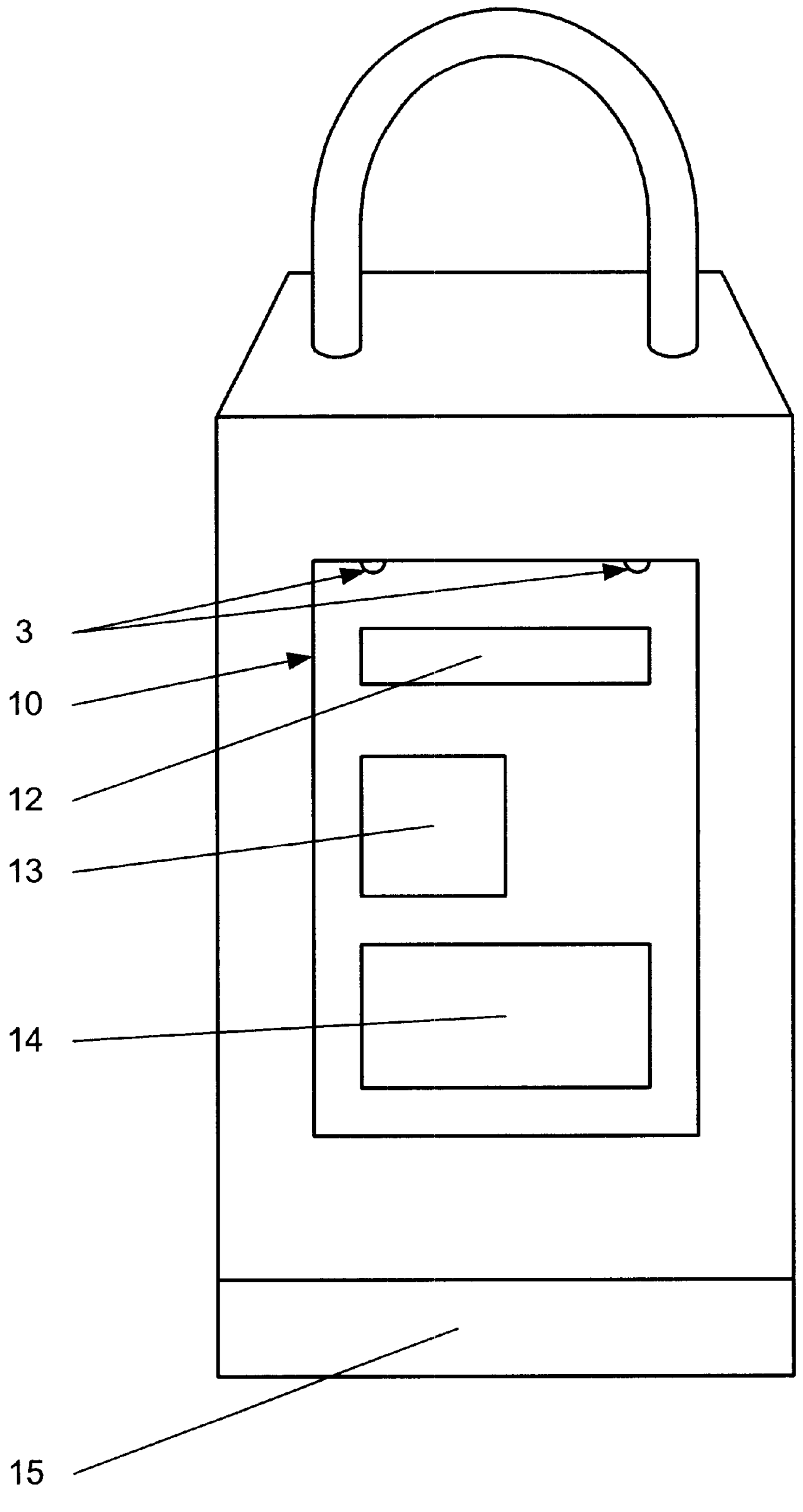
FIG. 2 is a perspective internal view of the circuitry on the inside of the lock box shown in FIG. 1.

FIG. 2 represents a cutaway internal view of the circuitry of the lock box. Circuitry board 10 contains the components for the electrical operation of the box. Power circuitry 12 filters the battery to supply steady DC power to the processing circuits while detecting the code pulses in the DC power being applied to contacts 3. Contacts 3 are merely extensions of the contacts 3 in FIG. 1. The sequence of electronic signals is prepared for delivery to the detector 14, which compares the received code data against previously stored codes to activate the solenoid to release the hasp 1 or the movable key receptacle 5 in the bottom of the box. A passive electronic circuit taking electrical power from the activator device (keypad) is shown in FIG. 2. The keypad supplies a binary sign to the lock box through contacts on the keypad to corresponding contacts 3 on the lock box which, in turn, are connected to the electronic circuits in the lock box. This occurs when the operator of the keypad supplies the correct sequence of touch pad keys to perform this operation.

In FIG. 2 the digital signal from the contacts 3 are matched against an expected pattern to cause the lock box to actuate the solenoid to release the receptacle when the pattern is matched. Additionally, the keypad supplies a unique pattern of signals in the same event, a fixed number of which are retained in the lock box circuitry which identifies the user and the time and date of entry. Upon receiving a different unique Signals the retained signals stored in the lock box are transmitted by the lock box on the same corresponding contacts 3 to a special device designed for that purpose. Because the special device must be taken to the box or the lock box removed and taken to the special device to download the information, the use of the special device is cumbersome and, in fact, is seldom used in practice. The existing technology relies on agents to voluntarily provide showing property data with a central computer site to obtain overall sales, which they often fail to do. This is unfortunate because the information contained in the lock box is valuable in the selling of a house or property. It is very useful to a listing agent to know immediately who has entered and the time and date of such entry.

Applicants have invented a device to be inserted in (or attached to) the lock box and connected to the circuitry therein for transmitting the information received from the keypad via a radio transmitter to a receiver connected via long range communications in the property or nearby secure location to a central computer for distributing the information. The long-range communications may be a telephone line, cellular telephone, or other wireless service.

Recent advancements in radio miniaturization make this enhancement to the existing lock box technology possible. The miniature transmitters and receivers are commonly found in such items as wireless automobile door lock units that fit on a key chain. The radio transmitters may be totally integrated into a single circuit or several small circuits that easily fit into an area of less than a square inch on a circuit board. Miniature regulators and transient protectors regulate the power from the module battery into the radio transmitter while protecting over-voltage and static discharge conditions. Capacitors store power for the transmitter for several seconds after the module is removed to guarantee proper transmission of the message between the module and the lock box to the nearby receiver. The electrical pulses transfer data from the keypad to the lock box and vice-versa through the contacts 3 of FIG. 1. The pulses will be intercepted and transmitted as a data stream to the nearby receiver. The pulses may be filtered or converted to an alternate code to control data bandwidth or enhance data reliability. The components to implement the enhancement to the lock box module will easily fit into the several square inches of circuit board space and allow a protective housing molded to fit into the keypad area on one side and accept the normally used keypad on the other. The enhancement module will connect the contacts 3 on the lock box to the contacts on the keypad.

The nearby receiver unit may also employ miniaturized components since the transmitter and receiver units are often sold in matching frequency and bandwidth pairs. The receiver unit may have other well-documented components: microprocessor, memory, modem and power regulators.

A further enhancement of this implementation is to establish two-way communications between the lock box and the nearby receiver. Two-way communications could add significantly more features: a real estate agent could be verified before granting access by establishing a link with the central computer before releasing the key. Stolen or lost keys could be disabled from unwanted intrusions and a full real-time database of activity can be established.

Figure 3:
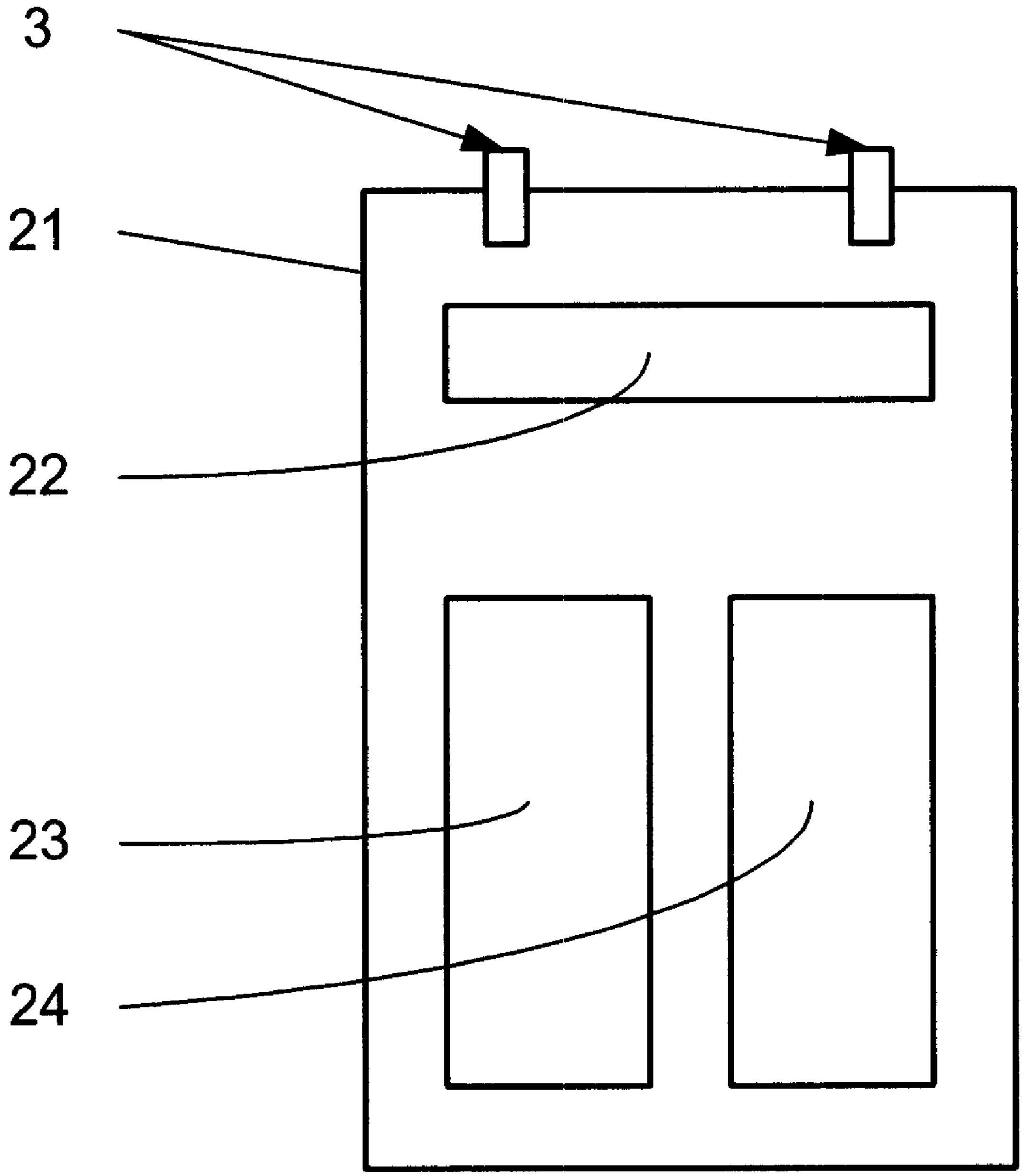
FIG. 3 is a perspective internal view of the enhanced lock box showing the circuitry added to the lock box of FIG. 1 to transmit the stored information to a receiver with modem and autodialer.

FIG. 3 is a perspective view of the device Applicants have invented and which is installed in or on a current lock box. Power for the "collector-transmitter" of the enhanced lock box can be supplied by the battery in the keypad or by placing a battery in the lock box. The same signals supplied to the enhanced lock box are also sent via radio to the nearby receiver-telephone device. The lock box can be disassembled and this new device is placed into the existing lock box which is then reassembled. The circuit of this new device (collector-transmitter) is attached to the contacts on the lock box to receive the signals from the keypad. The device can be installed on the outside of the lock box with an electoral connection to the contacts 3 in the lock box. The device can have a receptacle for the keypad.

Signals from the keypad are retained in the collector-transmitter until the transmission is successful to the receiver-telephone device. The content of a signal need not be altered in these devices except as is convenient. Multiple transmissions can be used to improve the probability of successful transmission. This does not preclude half-duplex or full-duplex communications. Alternatively, a receiver can be included in the collector-transmitter to receive a signal from the receiver-telephone that the transmission was successful.

Applicants' collector-transmitter consists of a circuit board 21, which may have a protective covering. This device fits inside of the lock box making contact with the contacts 3 of the lock box which provide contact with the keypad contacts. When the keypad module is inserted into the recessed area of the lock box shown in FIG. 1, the circuits of Applicants' collector-transmitter parallel the power and code contacts. The circuitry consists of the power filter and code detector 22. The logic section 23 accepts the codes and temporarily stores the codes until the message is complete. Logic section 23 then transmits a code through the RF transmitter 24. The RF antenna may be an etched circuit traced on the printed circuit board or short wire antennae, e.g., less than 5 inches long. The collector-transmitter adds error detecting and corrected coding to the message from the keypad to improve performance and reliability of message transmission. Additional features include surge protection from high voltage input, a microprocessor for control of the processes and retention of the signals. Signals mean the packet of information currently provided by the lock box and any future variations therein.

The radio transmitter of the collector-transmitter is operated on the standard bands in compliance with FCC regulations for this service. Several frequency bands are available at 300, 900 and 2000 megahertz bands. The radio transmitter can be supplied as a module from several manufacturers, e.g., RF Monolithics and Linx Technologies. Consistent with FCC regulations, this transmitter has a range of several hundred feet under normal operating conditions, which is consistent with FCC regulations. The modulation and band complies with required FCC standards.

Applicants' collector-transmitter is installed into the lock box is a very thin module that intercepts the power and the codes. The circuitry and RF transmitter require very low power and add only a small additional load on the battery in the keypad. This device will transmit the access codes a limited distance to a receiver which can receive and record the code's access. Preferably, a telephone with an auto-dialer modem is interconnected to the radio receiver for transmitting the access codes to a remote location.

Figure 6:
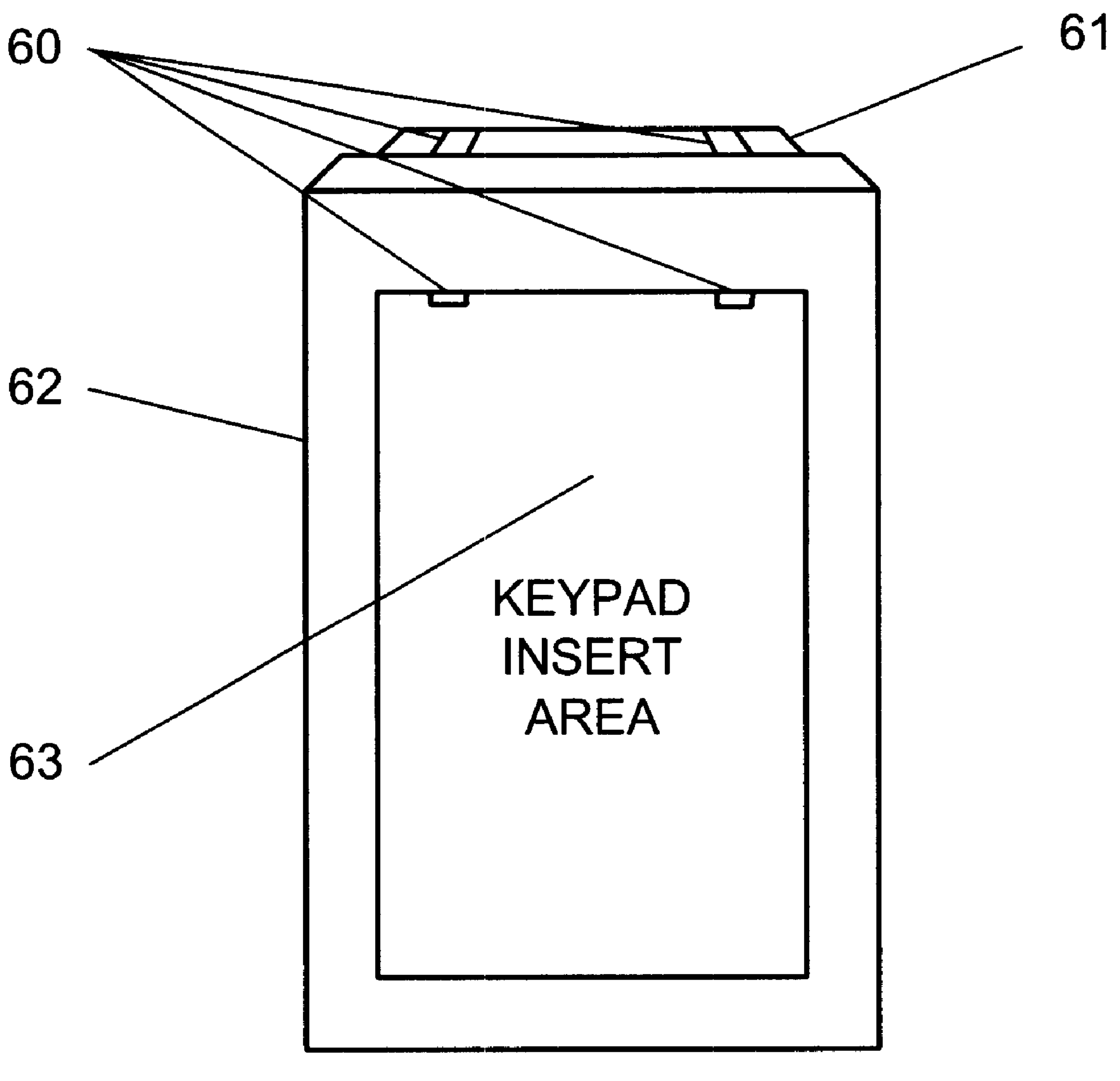
FIG. 6 is a perspective view of the collector-transmitter housing.

The housing 62 for the collector-transmitter for attachment to a lock box is shown in FIG. 6. The housing 62 is so shaped and molded that the back 61 is inserted into the lock box in space normally used to accept the keypad module. The front 63 of housing 62 is so shaped and molded to accept the keypad module. The contacts 60 connect directly to the contacts 3 on the lock box when properly inserted and directly connect through the housing 62 when the keypad module is properly inserted in the housing 62 direct electrical contact between the collector-transmitter and the lock box is maintained. Internal circuitry in the collector-transmitter connects to the contacts 60 to intercept power and the data transfer between the lock box and keypad.

When a keypad is inserted into the housing 62, the collector-transmitter will receive its power from the battery in the keypad. The two contacts 60 are also used for communications between the lock box and keypad. Communications consists of digital data formed by pulsing the power on the contacts. The data encoding and message protocol determine the transfer of data between the keypad and lock box. The encoding is the means by which binary data ones and zeros are determined by the widths and duration's of the pulses. Protocol refers to the format of the message: message headers, payload and error detection. The collector-transmitter need not decode or determine the message, but rather act as a radio relay of the pulses to the nearby receiver. The nearby receiver would recover the pulses and forward to the central site computer, which could decode and determine message protocol for all enhanced lock boxes. Decoding and protocol conversion in the enhanced lock box could be done if it proved advantageous in the deployment.

Figure 4:
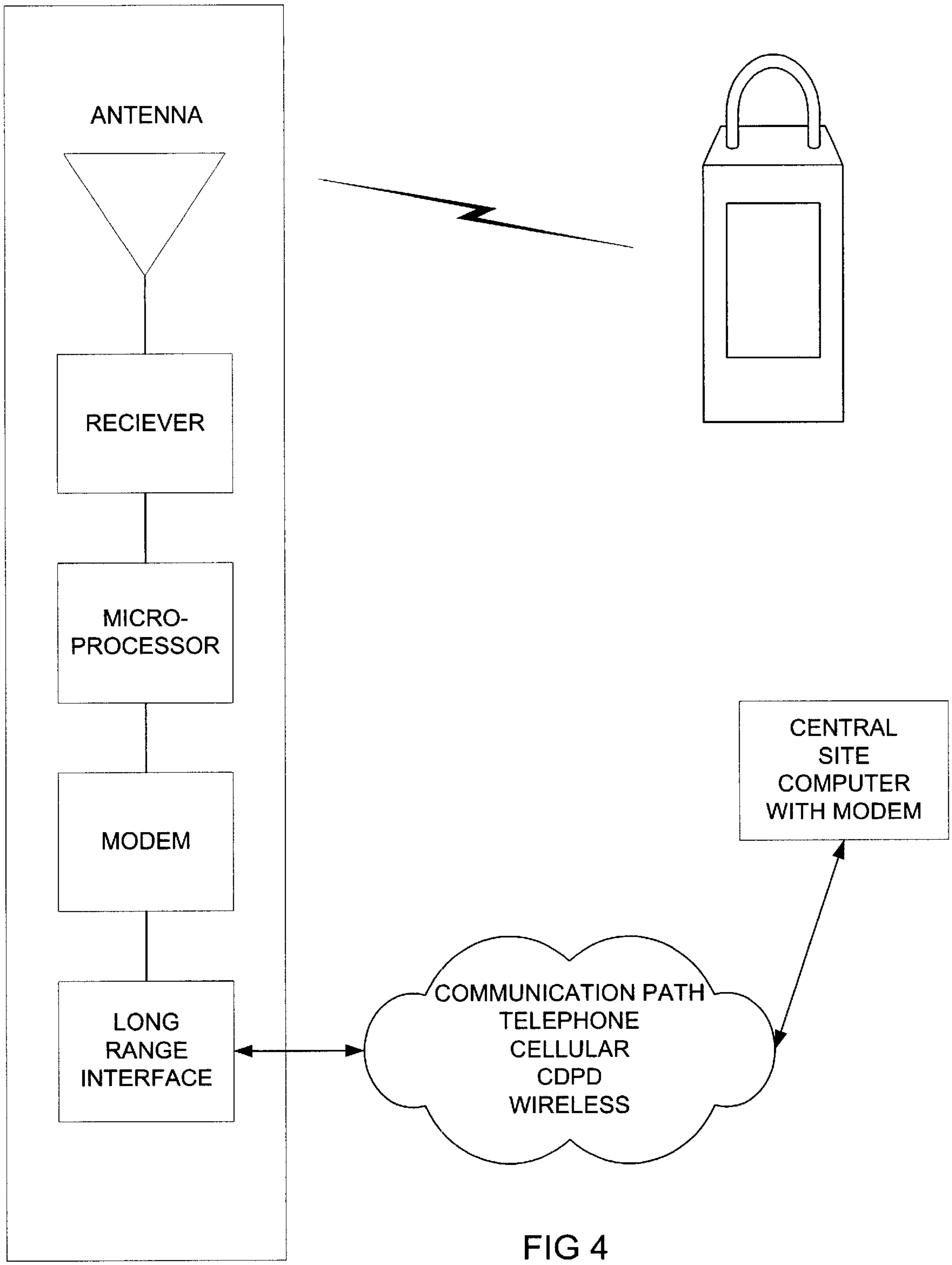
FIG. 4 is a schematic view of the enhanced lock box, the receiver unit and the central computer site.

FIG. 4 is a schematic view of a "radio receiver telephone" with a dialing modem under the control of a microprocessor. The radio receiver picks up the signal transmitted by the transmitter in the enhanced lock box and conveys it via the microprocessor, modem and telephone to a central site. The modem is under the control of the microprocessor and has dial out capability so that a call may be initiated from this location whenever a keypad message is received or on a periodic basis. The microprocessor has memory for the storage of multiple accesses of the enhanced lock box. The memory buffers messages in the event of telephone line failure or busy signals and adds the capability to provide periodic polling by the central site. The telephone line shown may be a wireless cellular link, cellular packet data (CDPD) interface or other long-range communications device. This radio receiver-telephone may be powered from the telephone loop current, standard AC power or other means such as rechargeable battery and solar power. The content and form of the signal from the lock box need not be altered by the radio receiver-telephone central site. Additional information may be added by the microprocessor to enhance message security, further identify the location with time of day protection, e.g., with two-way communication, the central site can easily change times allowed to access the property, alarm information such as burglary and fire alarms can be provided by this system.

Figure 5:
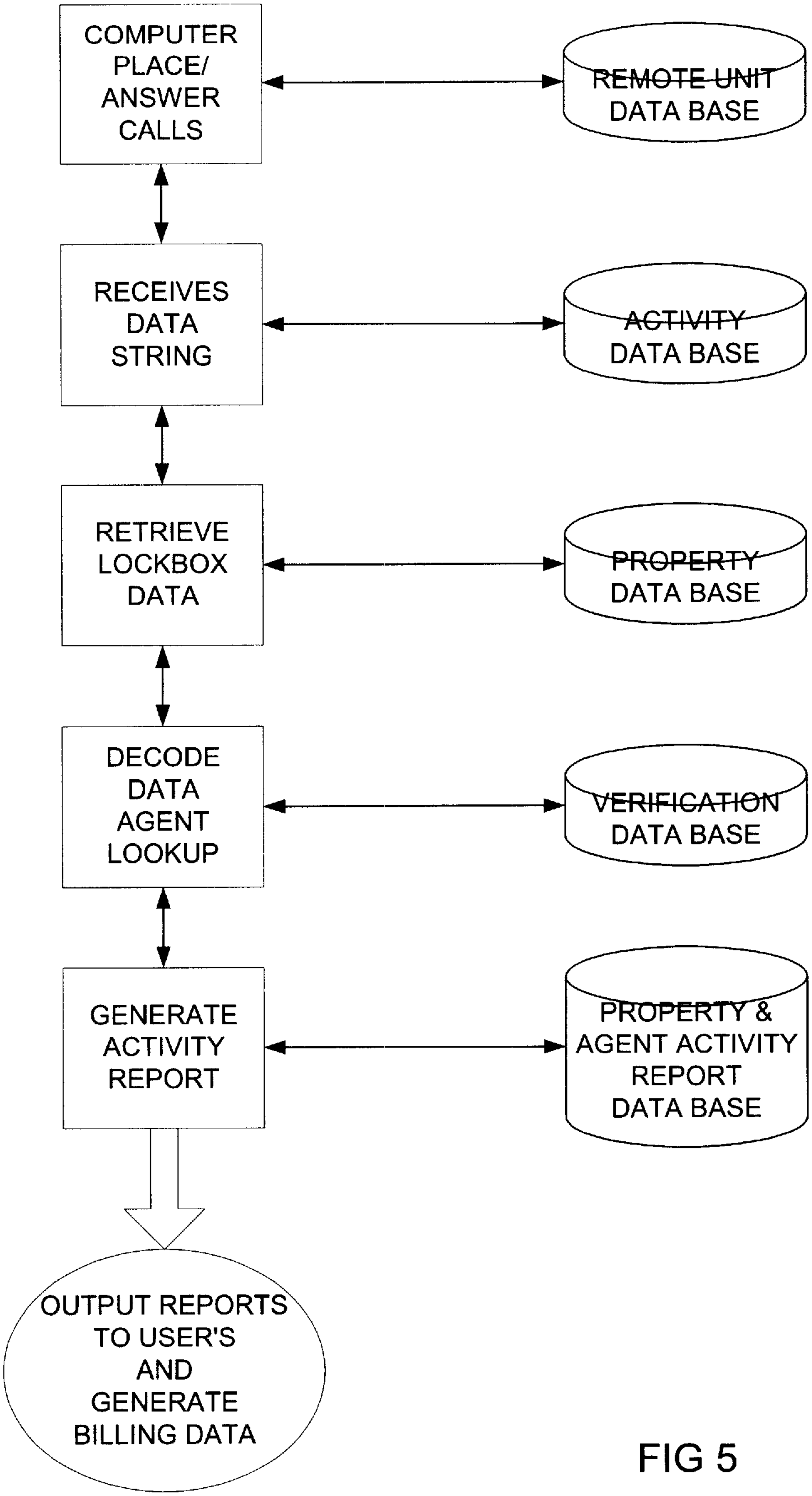
FIG. 5 is the flow process of the data received from remote units (enhanced lock boxes) at the central site.

FIG. 5 is a flow chart of the functions performed by a general purpose computer located at the central site. This computer is connected to telephone line(s) by standard technologies, e.g., a modem with dial out and auto-answer capabilities. A large number of enhanced lock boxes can be serviced from a single central computer site. The computer can convert the original lock box signal into the desired format and content for distribution to interested parties via inter-computer connections, facsimile, Internet, printer and/or voice services. Some of the processes that the general computer will perform for users utilizing the content of the signals it receives from the remote lock box units are as follows:

1. Signal from the lock box source is decoded to ASCII text characters. This provides such information as the lock box number, agent identification number, geographical location, time and date of entry.
2. Translation of the lock box number into current real estate address, and geographical area with associated additional information.
3. Translation of realtor number into the name of realtor with associated additional information.
4. Translation of the geographical number into identification label.
5. Schedule of services provided to realtor, selling agent and other groups desiring the information.
6. Various multimedia support technologies used to deliver information including use of the Internet.
7. Record keeping and billing based on data usage.

In summary, this invention provides an important enhancement to the existing lock box technology referred to in the above-mentioned patents. The importance of the enhancement is the significant improvement in the timeliness of recovery of lock box activity and, hence, the sales activity for a property with the enhanced lock box.

Figure 7:
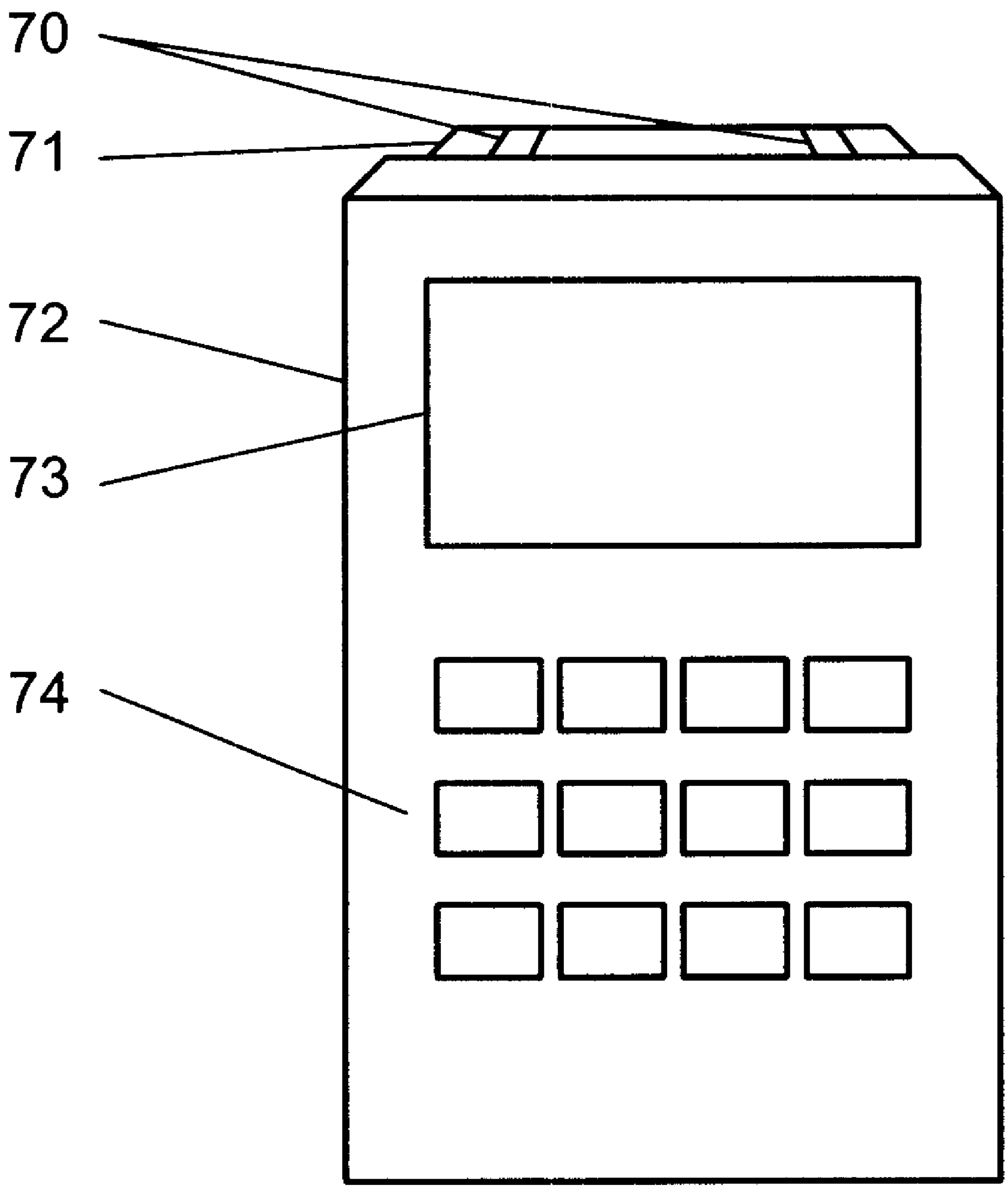
FIG. 7 is a perspective view of a wireless pager keypad.

FIG. 7 illustrates an implementation of the lock box enhancement that incorporates the wireless pager keypad. Number 70 are the contacts which mate with the existing lock box as described above. Number 71 is the enclosure which incorporates the battery and pager and is shaped so as to be reinserted into the lock box receptacle area. Number 72 is the front of the enclosure which provides access to the pager display, which is typically an LDC. Although the display may be used, it is not required for this enhancement. Number 74 is the keypad of the pager which may be used to enter return messages if a two-way pager is used.

In operation the enhancement is inserted into the lock box to be accessed. The agent using a cellular or landline telephone calls the central site computer and enters his agent code to identify the caller, and the lock box code. The central site computer activates a paging message which is received by the pager unit in the enhancement inserted in the lock box. The pager then activates circuitry to command the lock box to release the key retention mechanism. The display 73 on the pager may be used by the central site computer to also display information to the agent, such as verification of location of the lock box, showing activity or contract status. The keypad may be used to enter return messages to the central site computer such as agent ID code, problems with the lock box or the property. This implementation is similar in concept of using wireless technology and central site computer to gather timely information on sales activity for properties to be show for sale.

An alternate method using the same concept is that the user after inserting the module into the lock box to be accessed enters a user ID code as well as a lock box ID code. These codes are used to activate the key release mechanism while simultaneously being transmitted to the central site computer. The central site computer then acts as a data collection system without returning an authorization message. All of these methods fulfill the objective of this enhancement which is to gather timely and accurately information on the showing activity of a property for sale.

What is claimed is:

1. In an electronic lock system for operating an electromechanical lock box having an input port for an electronic key with a power source, the addition of a radio data link to relay information to a nearby receiver with a connection to an autodialer modem capable of connecting to a central site computer comprising:

(a) a housing that adapts to the lock box and accepts the electronic key while maintaining electrical contact between the lock box and the key;

(b) means for attaching said housing to the lock box, with said housing containing a miniature radio transmitter with antenna, which is powered from the power source via said electronic contact between the lock box and the electronic key;

(c) circuitry within the housing to convert the electrical pulses from the electrical contact with the lock box to the electronic key in a form that can be electrically applied to modulate the radio transmitter in the housing;

(d) a receiver located in a nearby location to the lock box which is tuned to the frequency of the radio of the radio transmitter in the housing;

(e) an auto-telephone dialer connected to the receiver to call a central site computer to retransmit the lock box data to the central site computer for final processing;

(f) a central site computer to service a plurality of lock boxes, interpret the data and process the data into meaningful reports.

2. The electronic lock system of claim 1, wherein the housing also contains circuitry to regulate the power from the electronic key and maintain the power for a brief time after the key is removed from the lock box housing for complete communications with a nearby receiver.

3. The electronic lock system of claim 1, which also has a microprocessor connected to the receiver to record the lock box data into local memory to be saved for transmittal to the central site computer when the connection between the autodialer and the central computer is operational.

4. The electronic lock system of claim 1, wherein the power source is a battery contained within the electronic key.

5. The electronic lock system of claim 3, wherein the housing also contains circuitry to regulate the power from the electronic key and maintain the power for a brief time after the key is removed from the lock box housing to complete communications with a nearby receiver.

6. The electronic lock system of claim 5, wherein the power source is a battery installed within the electronic key.

7. The electronic lock system of claim 5, wherein the electronic key has keypad for entering a code that will permit the conveying of the electronic pulses to the lock box and the lock box has a receptacle for containing a key which will be opened upon the receipt of the lock box of the appropriate electrical pulses with the keypad transmitting the code through the microprocessor with the microprocessor having the identification code of the lock box programmed into its memory for transmission with the code from the electronic key to the central site computer.

8. In an electronic lock system for operating an electromechanical lock box having an input port for an electronic key with a power source, the addition of a radio data link to relay information to a nearby receiver with a connection to an autodialer modem capable of connecting to a central site computer comprising:

(a) the lock box containing a miniature radio transmitter with antenna which is powered from the power source via electronic contact between the lock box and the electronic key;

(b) circuitry within the lock box to convert the electrical pulses from the electrical contact between the lock box and the electronic in a form that can be electrically applied to modulate the radio transmitter in the lock box;

(c) a receiver located in a nearby location to the lock box which is tuned to the frequency of the radio of the radio transmitter in the lock box;

(d) an auto-telephone dialer connected to the receiver to call a central site computer to retransmit the lock box data to the central site computer for final processing; and (e) a central site computer to service a plurality of lock boxes, interpret the data and process the data into meaningful reports.

9. The electronic lock system of claim 8, wherein the lock box also contains circuitry to regulate the power from the electronic key and maintain the power for a brief time after the key is removed from the lock box for complete communications with a nearby receiver.

10. The electronic lock system of claim 8, which also has a microprocessor connected to the receiver to record the lock box data into local memory to be saved for transmittal to the central site computer when the connection between the autodialer and the central computer is operational.

11. The electronic lock system of claim 8, wherein the power source is a battery contained within the electronic key.

12. The electronic lock system of claim 10, wherein the lock box also contains circuitry to regulate the power from the electronic key and maintain the power for a brief time after the key is removed from the lock box to complete communications with a nearby receiver.

13. The electronic lock system of claim 12, wherein the power source is a battery installed with an electronic key.

14. The electronic lock system of claim 12, wherein electronic key has keypad for entering a code that will permit the conveying of the electronic pulses to the lock box and the lock box has a receptacle for containing a key which will be opened upon the receipt of the lock box of the appropriate electrical pulses with the keypad transmitting the code through the microprocessor with the microprocessor having the identification code of the lock box programmed into its memory for transmission with the code from the electronic key to the central site computer.

* * * * *

UNITED STATES PATENT AND TRADEMARK OFFICE

CERTIFICATE OF CORRECTION

PATENT NO. : 6,472,973 B1
DATED : October 29, 2002
INVENTOR(S) : Harold et al.

It is certified that error appears in the above-identified patent and that said Letters Patent is hereby corrected as shown below:

Title page,
Item [76], Inventors, delete the inventor's name "Larson Robin" and replace with -- Robin Larson --.

Signed and Sealed this

Twentieth Day of May, 2003

JAMES E. ROGAN
*Director of the United States Patent and Trademark Office*